United States Patent [19]
Grimes et al.

[11] Patent Number: 6,015,019
[45] Date of Patent: Jan. 18, 2000

[54] AUXILIARY DRIVE AND STEERING SYSTEM FOR A VEHICLE

[75] Inventors: Lahon H. Grimes; Karl V. Grimes, both of Springfield; James E. Yelton, Eugene, all of Oreg.

[73] Assignee: Chassis Remote, Inc., Springfield, Oreg.

[21] Appl. No.: 09/074,949

[22] Filed: May 8, 1998

[51] Int. Cl.$^7$ .................................................. B60K 25/00
[52] U.S. Cl. ........................................ 180/53.2; 180/324
[58] Field of Search ................................ 180/53.2, 53.4, 180/321, 324

[56] References Cited

U.S. PATENT DOCUMENTS

| | | | |
|---|---|---|---|
| 3,599,814 | 8/1971 | Brownfield | 180/53.2 |
| 3,779,608 | 12/1973 | Hatcher et al. | 180/53.2 |
| 4,318,451 | 3/1982 | Liggett | 180/324 |
| 4,527,656 | 7/1985 | Walbridge et al. | 180/321 |
| 4,846,581 | 7/1989 | Osterlund et al. | 366/61 |
| 5,190,118 | 3/1993 | Yelton | 180/53.2 |
| 5,226,497 | 7/1993 | Beaton | 180/53.2 |

Primary Examiner—Kenneth R. Rice
Attorney, Agent, or Firm—James D. Givan, Jr.

[57] ABSTRACT

A vehicle is disclosed including a load carrying box for the transport of material to a work site in an over-the-road manner. An auxiliary drive and steering system operates at the site for control of vehicle speed and direction with the vehicle operator re-located out of the vehicle to monitor material discharge. The motor drives the vehicle through a gear reduction unit and power transmission component powering a tooth plate clutch mounted on a driveline segment. An engine powered hydraulic pump provides an auxiliary drive bi-directional motor with a remotely controlled directional valve regulating motor speed and direction. A motor control circuit also includes counterbalancing valves served by the directional valve and a torque relief valve dissipating motor torque at the end of an auxiliary drive operation allowing clutch disengagement without risk of clutch damage. An auxiliary steering system includes a directional valve to control in an infinte manner, motor speed and direction in proportion to signal strength. An operator's station, located exteriorly of the cab, includes joystick control means for transmitting signals to the drive and steering directional valves to regulate the same in proportion to the strength of signals transmitted. The steering directional valve is biased to a closed position to retain the steered wheels in a selected position when traversing irregular terrain.

11 Claims, 5 Drawing Sheets ered by a hydraulic
ic motor also utilizing a hydraulic motor
AUXILIARY DRIVE AND STEERING SYSTEM FOR A VEHICLE

BACKGROUND OF THE INVENTION

The present invention pertains generally to vehicles which must be guided in a precise manner at a delivery or work site by an operator located at other than the driver's station.

In the delivery of earthen materials such as aggregate, sand and gravel, it is often highly desirable to distribute the load along a path or course and at a desired depth to avoid doing same later by costly manual labor. Construction sites however often include irregular terrain which greatly hinders vehicle maneuvering during delivery. This, coupled with the fact that tight quarters are frequently encountered, makes it highly desirable to have the vehicle driver out of the truck cab and stationed where he can best observe discharging of material. Such delivery is still further complicated by the amount and heavy nature of the earthen material being delivered which necessitates the vehicle be of considerable size and weight. Known systems for such delivery operations have been proposed where the driver/operator is stationed out of and usually at the rear of the vehicle. The difficult conditions encountered at work sites, including uneven terrain, imparts severe loads on the vehicle driveline and presents some risk of a runaway vehicle or, at least, hinders uniform discharge of material along a course.

In the prior art is U.S. Pat. No. 5,190,118 which discloses a system directed toward delivering aggregate from a truck with the driver relocated at the rear of the vehicle. The differential requires, in effect, two drive shafts, one powered by the truck engine and the second powered by a hydraulic motor with a steering system also utilizing a hydraulic motor all controlled by an operator stationed at the truck rear end.

U.S. Pat. No. 4,318,451 discloses a truck whereat an operator may steer the vehicle from a cab or from a second cab located on a turntable equipped with a boom and shovel.

U.S. Pat. No. 4,527,656 shows a truck with a rearwardly stationed operator having controls coupled to a steering motor and to an air cylinder for shifting a gear selector.

U.S. Pat. No. 4,846,581 shows a concrete mixer truck with a rear operator station. A traverse control regulates the angle of a swash plate 36 of a pump to regulate the speed of a hydraulic motor 38 which drives a PTO engageable with the vehicle transmission. A remote steering system utilizes an assist cylinder coupled to a steering arm of the truck. Some braking action occurs through control of a pump swash plate.

The known prior systems do not address the problem of providing precise speed and steering controls nor the problems encountered when coupling and uncoupling a hydraulic motor from a vehicle driveline. Heretofore the known prior art systems do not provide means for imparting auxiliary system torque to a vehicle driveline and subsequently terminating same without risk of damage to components.

SUMMARY OF THE PRESENT INVENTION

The present invention is embodied in a vehicle for travel over various types of terrain in a precise and controlled manner with the driver remotely disposed from the vehicle cab and able to monitor load discharge if desired.

An auxiliary drive assembly is installed on a truck driveline with a base of the assembly supported by the truck chassis. A fixed displacement hydraulic motor, equipped with a brake, drives a gear reduction box which in turn drives a driveline mounted clutch member. A control circuit for the hydraulic motor includes a directional valve for forward and reverse truck travel. Before hydraulic motor operation can occur, circuit pressure must be adequate to open a piloted counterbalance valve and to release a brake acting on the output shaft of the hydraulic motor. In the motor circuit a normally closed by-pass valve, when opened, connects the motor inlet and outlet lines to dissipate any residual torque in the auxiliary drive assembly to permit opening of the driveline mounted clutch without damage to plates of the clutch or other vehicle driveline components.

A steering circuit for the vehicle includes a directional valve to control the direction of a steering motor which is coupled, via a clutch and power transmission means, to the truck steering column. The valve includes an all ports closed, center position to hold the wheels in a canted position when underway to maintain a desired course when ground camber is present.

The directional valves of the two circuits noted above are the proportional type and respond to control signals in a proportional manner to the remote control of the present system.

A brake biasing system provides low air pressure to the vehicle brake system to impart a slight degree of bias thereto to reduce or prevent any tendency of the vehicle to oscillate or rock against the drive system which could occur especially during slow speed travel over uneven terrain. Such bias is terminated when the auxiliary drive system is deactivated.

Important objectives of the present invention include the provision of an auxiliary drive system including a hydraulic motor coupled to the vehicle drive line via a drive line mounted clutch to propel the vehicle at slow speeds during an unloading operation facilitating the desired placement of the delivered material at a work site; the provision of an auxiliary drive system for a vehicle including a hydraulic motor and gear reduction drive coupled to the vehicle drive line permitting the vehicle driver, stationed exteriorly of the vehicle, to control vehicle speed and direction in a highly precise manner; the provision of an auxiliary drive system, including a hydraulic motor, with an associated hydraulic circuit capable of dissipating high motor torque loads during starting and stopping of vehicle operation by the present auxiliary system; the provision of an auxiliary drive and steering system for a vehicle including a steering motor coupled via a clutch to the steering shaft of the vehicle with associated hydraulic components permitting the steering wheels of the vehicle to be set at a position to compensate for camber of a ground surface along a course of the vehicle to avoid departure from a desired track; the provision of auxiliary drive and steering systems which permit precise speed and directional control of a large vehicle or truck using a joystick and directional valves which respond in a proportional manner to joystick displacment.

DETAILED DESCRIPTION OF THE PREFERRED EMBODIMENTS

Figure 1:
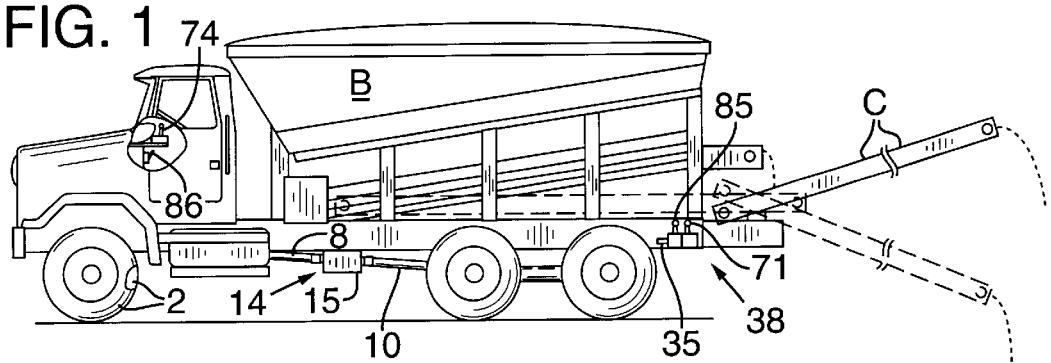
FIG. 1 is a side elevational view of a vehicle equipped with the present auxiliary drive and steering system.
Figure 2:
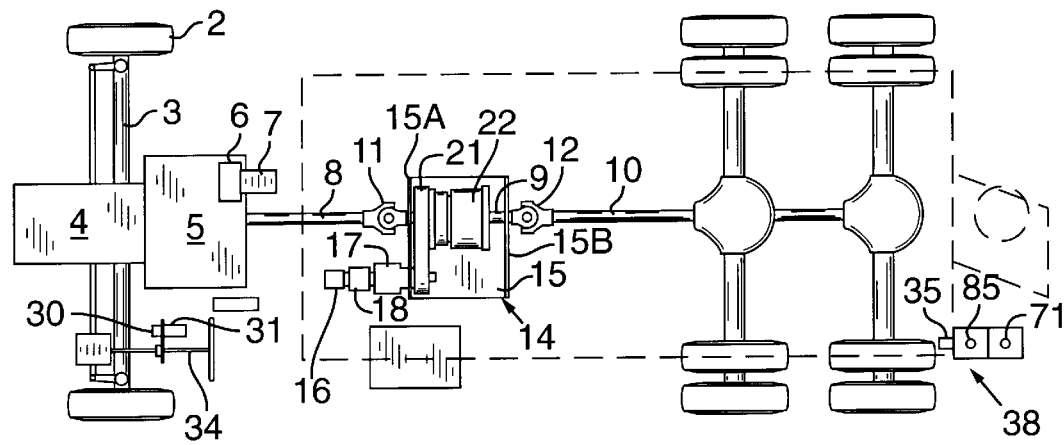
FIG. 2 is a plan view of the vehicle showing parts thereof in combination with components of the present auxiliary drive and steering systems.
Figure 3:
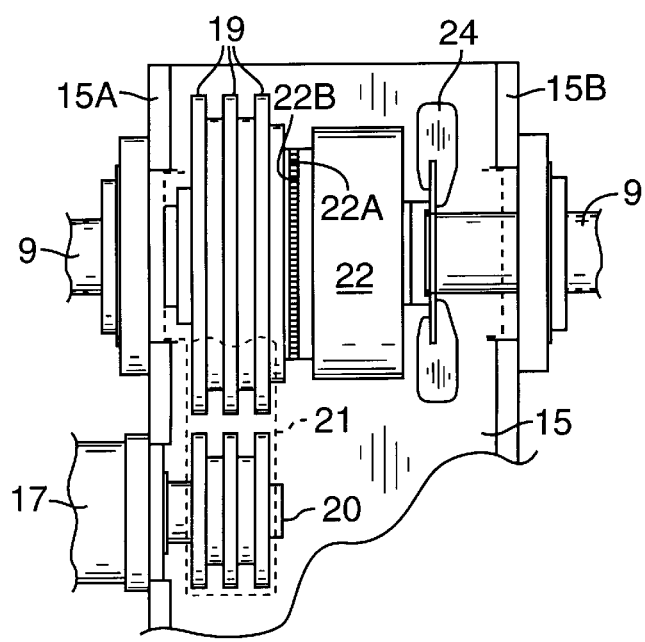
FIG. 3 is a fragmentary plan view of auxiliary drive components of the present system.

With continuing attention to the drawings wherein applied reference numerals indicate parts similarly hereinafter identified, the reference numeral 1 indicates the front end of a truck supported by steerable wheels 2 on an axle 3. A prime mover or engine 4 is coupled to a transmission 5 of the type having a power takeoff at 6 for selective driving of a positive displacement hydraulic pump 7. A vehicle driveline comprises segments 8, 9 and 10 with universal joints at 11 and 12. A truck box is at B.

With attention now to the present auxiliary drive assembly indicated generally at 14 and including a platform or base 15 secured in place intermediate the rails (not shown) of the vehicle frame. Front and rear drive plates are at 15A and 15B. A fixed displacement hydraulic motor 16 drives a gear reduction drive 17 housed in a case. The motor output shaft (not shown) extends through a brake 18 actuated into shaft engagement by spring biased disc components of the brake. As later explained, release of brake 18 is effected by hydraulic presure. An output shaft 20 of gear reduction drive 17 carries multiple sprockets on which is entrained a chain drive 21, also entrained about multiple sprockets 19 carried by driveline segment 9. A pneumatically actuated tooth plate clutch 22 on base 15 includes a plate 22A carried by multiple sprockets 29. A pressure plate 22B is coaxial with shaft segment 9 and axially positionable and keyed to shaft 9. A fan 24 in place on drive segment 9 provides a continuous flow of air over clutch 22 to dissipate heat resulting from friction generated by bearing components supporting the clutch in a manner permitting rotation between shaft 9 and the clutch housing when the clutch is disengaged and the truck powered in the conventional manner. From the foregoing it will be seen that hydraulic motor 16, during auxiliary drive, powers gear reduction box 17 to drive chain transmission 21 and drive shaft segment 9 upon engagement of the clutch plates. At low vehicle speeds, during auxiliary drive system operation, no requirement exists for cooling the clutch housing. A suitable pneumatic clutch is that clutch sold under the registered trademark Air Champ by the Horton Manufacturing Co.

An auxiliary steering system is simultaneously activated along with the auxiliary drive assembly and occurs upon the vehicle operator activating an air pressure system including tank T (FIG. 7) of the vehicle to shift power takeoff 6 into transmission engagement. A pneumatic clutch 30 of the auxiliary steering system is served by an air line 29 and when actuated couples the output shaft 31A of a hydraulic steering motor 31 and with the drive sprocket 32 of a chain drive 32A to power a driven sprocket 32B in place on a truck steering column 34. Upon termination of use of the auxiliary steering system, deactivation of pneumatic clutch 30 returns the vehicle steering system to conventional operation with the disengaged clutch posing no interference to such operation. Clutch 30 permits slipping in the event of abnormal steering loads to protect steering system components. A suitable air clutch is sold under the registered trademark AIR CHAMP by the above noted company.

During travel of the vehicle when powered by the auxiliary drive assembly a brake biasing system is activated, as later explained, to provide light application of the vehicle brakes to provide low pressure air to the vehicle brake system to provide a modest bias condition to prevent intermittent surging of the vehicle as may otherwise occur during slow speed travel over rough or uneven terrain during discharge of material at a construction site. Vehicle speed is critical during discharge of discrete material as even small changes in vehicle speed results in variation of the depth of deposited material which is undesirable and incurs subsequent manual effort to level the material to the desired depth. The application of low pressure air to vehicle brake system is accomplished via a manually operated manually settable pressure regulator 35 located at the operator's remote control station 38 at the rear of the vehicle.

Figure 4:
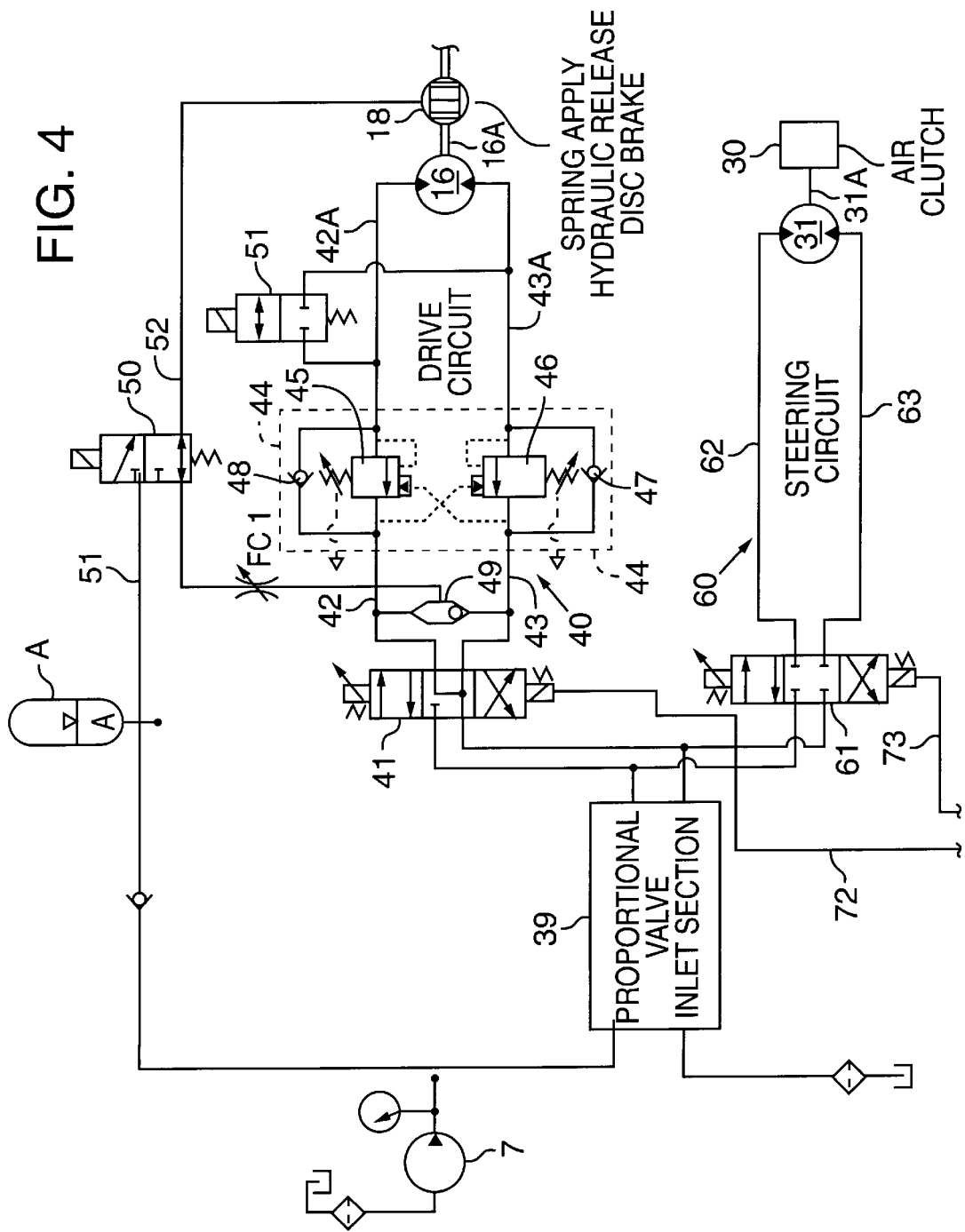
FIG. 4 is a hydraulic schematic with the auxiliary drive and steering system in neutral.
Figure 5:
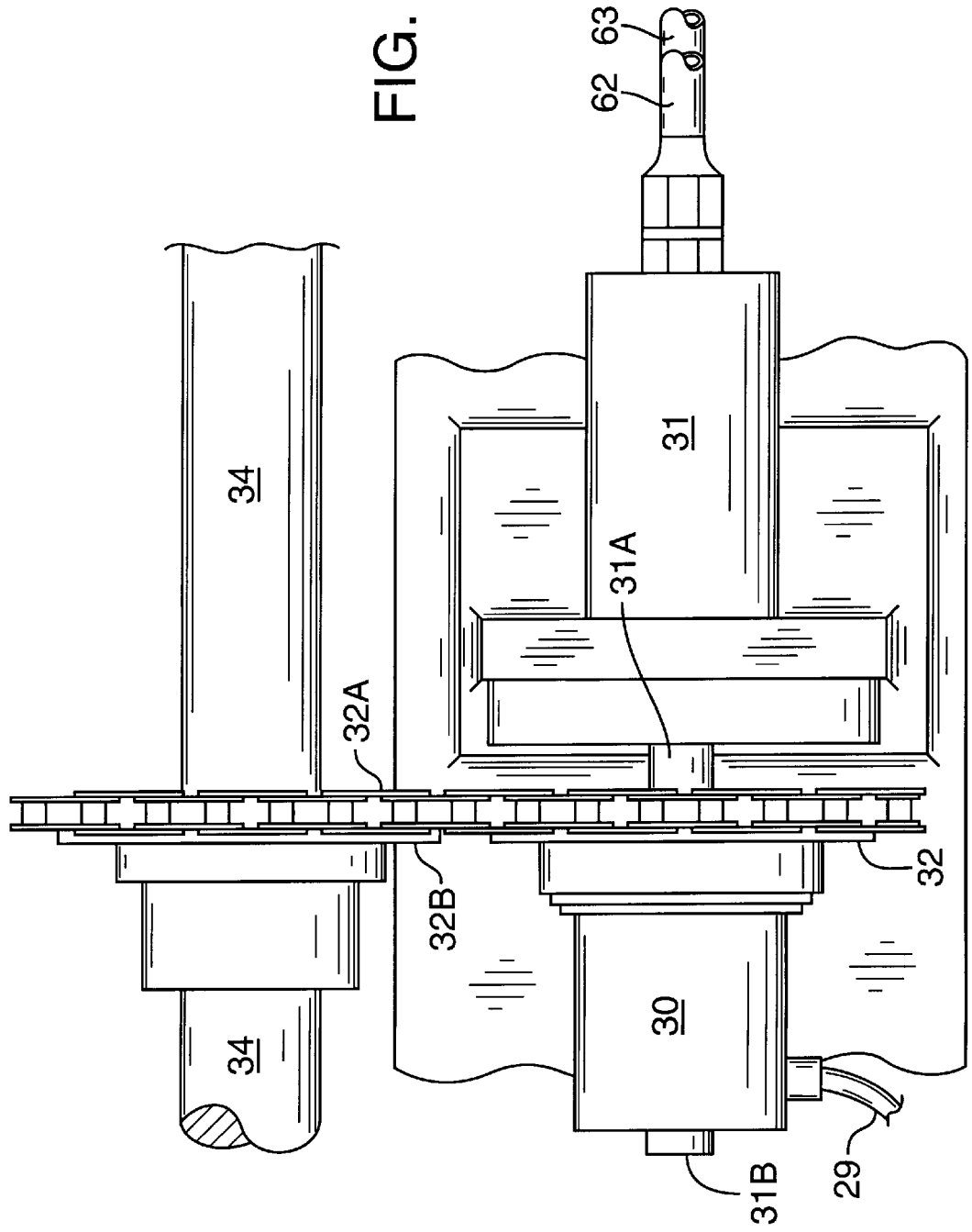
FIG. 5 is a side elevational view of steering components coupled to a fragment of the vehicle steering column.

With regard to hydraulic auxiliary motor drive and steering circuit, as shown in FIG. 4, PT0 driven pump 7 is of the fixed displacement, vane type and delivers pressurized fluid to a valve inlet section 39 with discharge therefrom directed toward auxiliary motor drive circuit 40 and auxiliary steering circuit 60. Fluid flow is regulated by a four way directional valve 41 in circuit 40 which is spring centered to a float center position and actuated by solenoids in a manner proportional to control signals to control direction and speed of bi-driectional hydraulic motor 16. Hydraulic lines are at 42–42A and 43–43A. A counterbalance valve assembly at 44 includes pilot operated valves 45 and 46 with integral check valves 47–48 individually in lines 42–42A and 43–43A. Upon the admission of a fluid flow into either hydraulic line 42–42A or 43–43A by valve 41, motor operation is delayed until pilot operated valve 45 or 46 (depending on motor direction) is piloted open for fluid return via line 42 or 43. Check valves at 47–48 are in parallel with pilot operated counterbalance valves 45 and 46. A shuttle valve at 49 provides fluid pressure from either line 42 or 43 to a three way, two position valve 50 in communication with brake 18, acting on the motor shaft 16A, to release the brake at a pressure somewhat below the pressure at which motor 16 will start. With continuing regard to auxiliary motor drive circuit 40, a two position torque release valve at 51 is normally closed and at termination of an auxiliary drive operation is opened to communicate hydraulic lines 42A and 43A of circuit 40 to dissipate any residual torque in motor 16. Upon such termination two position valve at 50 is actuated to admit pressurized fluid from an accumulator A through line 52 to release brake 18 from motor output shaft 16A and permit the motor to dissipate any torque remaining in the vehicle driveline and brake 18. Subsequent to dissipating torque, both driveline mounted clutch 22 and power take-off 6 may be shifted to disengaged status for subsequent over-the-road operation.

At the initiation of an auxiliary drive operation with the vehicle operator relocated at remote station 38, a remote control 70 (later described) is actuated to open directional valve 41, shuttle valve 49 will direct pressurized fluid past open valve 50 and through line 52 for release of hydraulic brake 18 which occurs at a pressure somewhat below the pressure at which either piloted counterbalance valve 45 or 46 (depending on motor direction) will open to allow fluid passage and motor operation.

With regard to the auxiliary steering circuit, as best shown in FIG. 4, valve inlet section 39 apportions a fluid flow toward directional valve 61 of a steering circuit generally at 60 including hydraulic lines 62 and 63 serving inlet and outlet ports of bi-directional steering motor 31. The spool of valve 61 is spring centered whereat fluid flow is blocked to and from hydraulic lines 62 and 63 to maintain the vehicle steering shaft 34 against rotation. For operation of the auxiliary steering system, air clutch 30 is actuated by air pressure via air line 29 and effects coupling of motor output shaft 31A with chain drive 32A. Steering clutch 30 will slip, as earlier noted, to safeguard the vehicle steering system from excessive steering forces.

Figure 6:
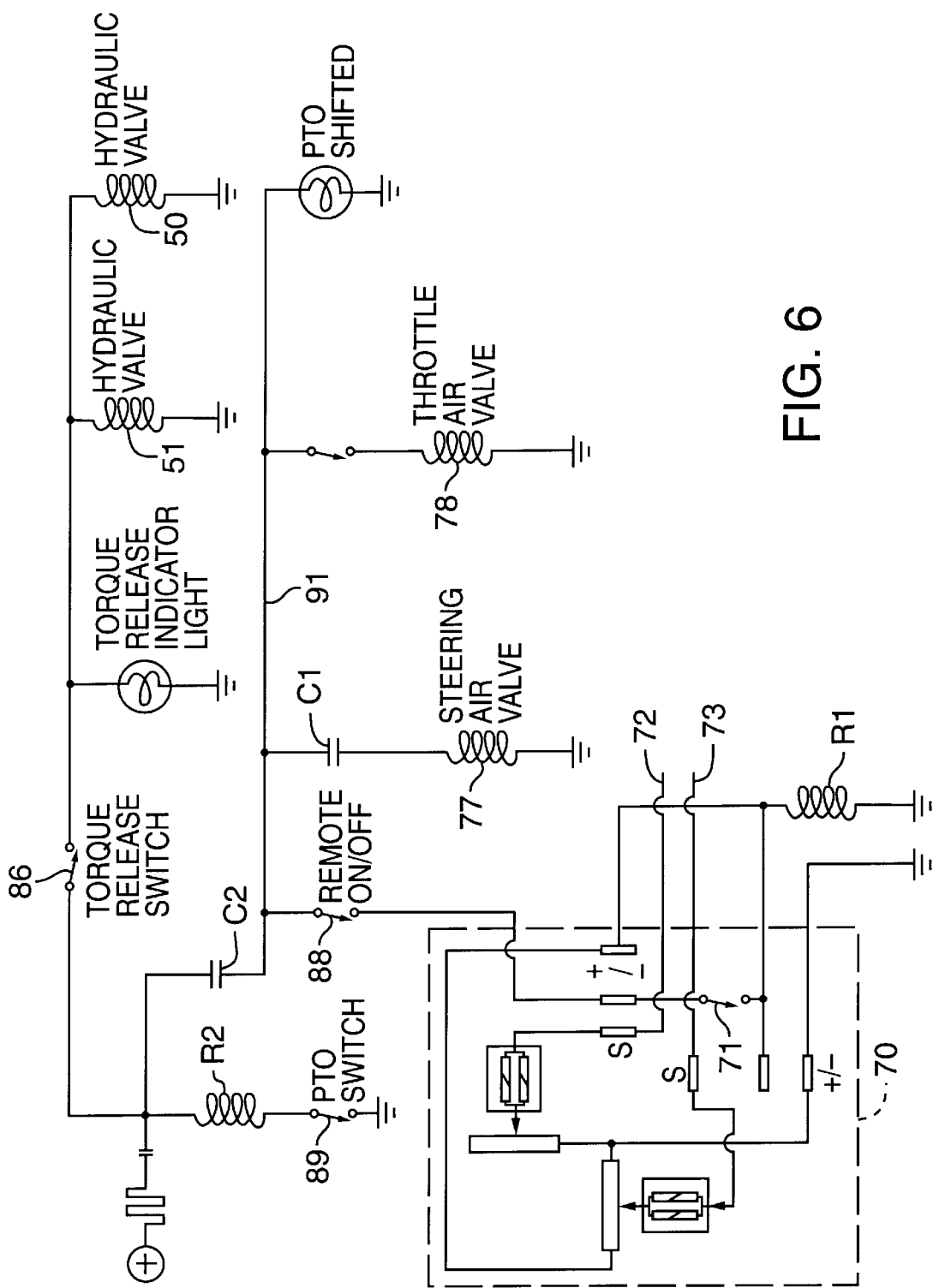
FIG. 6 is an electrical schematic.

A joystick electrical remote control at 70 is shown in FIG. 6 and is actuated by the closing of a cab located switch 88 and controls multiple functions including positioning of directional drive and steering valves 41 and 61 through electrical leads 72–73. A remote control lever 71 of the remote control is positionable in a universal joystick manner with electrical signals being provided to directional valves 41 and 61 to achieve infinitely regulated fluid flows. A suitable joystick type of remote control 70 is manufactured by the Danfoss Corporation and identified by the trademark PVRES. Valves 41 and 61 may be of the above noted manufacturer and model No. PVG 32-2, two spool proportional and load independent. Joystick control lever 71 automatically centers when released. A relay R1, upon lever displacement, closes contacts at C1 to open air valve 77 and engage clutch 30 with steering motor output shaft 31A.

In the event of a possible truck runaway condition, pressure at the inlet port of motor 16 drops below the opening pressure of the pilot operated counterbalance valve in the outlet line of the motor to restrict outlet flow from the motor. Simultaneously reduced fluid pressure in line 42 or 43 (depending on the direction of motor rotation) will result in reduced fluid pressure in shuttle valve 49 and line 52 to permit motor shaft brake 18 (spring applied) to engage and restrict rotation of motor shaft 16A.

Figure 7:
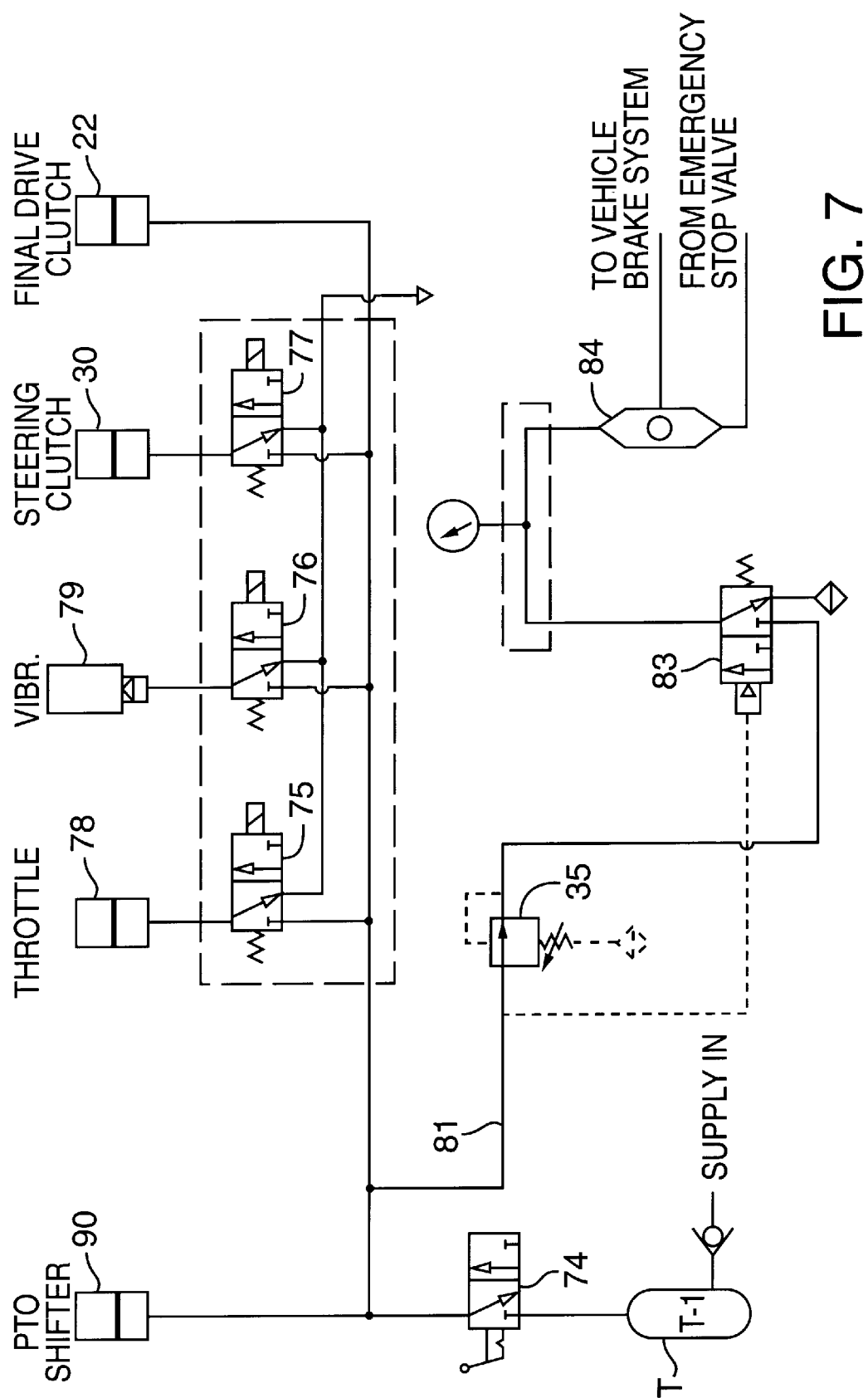
FIG. 7 is a schematic of pneumatic components of the present system.

In FIG. 7, the schematic shows cab located manually actuated valve 74, when opened, results in PTO 6 being shifted into engagement with transmission 5. A relay R2 in FIG. 6 is closed to close contacts C2 to a bus 91. Pressurized air from a vehicle air tank T is provided to solenoid valves 75, 76 and 77 which serve respectively a throttle actuating cylinder 78, a truck box vibrator 79 and steering clutch 30. Manually actuated valve 74 also engages auxiliary drive clutch 22 with the vehicle driveline. A branched air line 81 serves manually settable pressure regulator 35, located at operator's remote station 38, to provide a reduced pressure via a pilot operated valve 83, to a shuttle valve 84 and to the vehicle brake system to bias the vehicle brakes as earlier described. Shuttle valve 84 is also in communication with tank pressure via an off-on emergency stop valve 85 (FIG. 1) to enable emergency application of tank pressure to the vehicle brakes.

With attention again to FIG. 6, a torque release switch at 86 when closed at the end of an auxiliary drive operation serves to open valve 51 to communicate motor hydraulic lines 42A–43A and valve 50 to direct a flow from accumulator A to release motor brake 18 prior to disengagement of pneumatic clutch from the driveline. For energizing remote control 70, a switch 88 is actuated by the vehicle operator prior to leaving the vehicle cab. Operator actuation of air valve 74 in the cab directs pressurized air to a power takeoff shift cylinder 90 (FIG. 70), which engages power takeoff 6 with transmission 5 and simulataneously closes a switch 89 to energize a relay R2 to close contacts C2 to energize the bus 91.

The transmission of control signals from remote control 70 to directional valves 41 and 61 is shown by conductors 72–73, however in certain embodiments of the present invention it may be desirable to transmit such signals by radio transmissions. Such transmission of signals is believed within the skill level of those of ordinary skill in the field of hydraulics.

The present invention is shown and described in conjunction with a vehicle for delivery of aggregate via a chute C at a work site and is not to be construed as limiting the invention to use with such a vehicle.

While we have shown but a few embodiments of the invention, it will be apparent to those skilled in the art that the invention may be embodied still otherwise without departing from the spirit and scope of the invention.

Having thus described the invention, what is desired to be secured by a Letters Patent is:

We claim:

1. In a vehicle of the type having a cab for an operator of the vehicle; a vehicle engine; a vehicle transmission connected to the vehicle driveline; a vehicle steering system with components including steering column and steerable wheels; a vehicle air brake system; and a power take-off engageable with the transmission, the improvement comprising, a hydraulic pump powered by the vehicle power takeoff, an auxiliary drive assembly offset from the ends of said driveline for powering the driveline during remote operation of the vehicle and including a fixed displacement bi-directional hydraulic motor with inlet and outlet ports driven by said pump and having an output shaft, a brake engageable with the motor output shaft, a gear reduction unit driven by said output shaft, a clutch including plate members one of said members connected to the driveline, power transmission means coupling said gear reduction unit with said clutch, a control circuit for said hydraulic motor and including a first directional valve, a counterbalance valve of the auxiliary drive assembly including piloted counterbalancing valves jointly served by said first directional valve, a torque relief valve in communciation with the inlet and outlet ports of said motor and openable to equalize fluid pressure between said ports to dissipate torque from said motor output shaft, a brake release valve in communciation with said brake of the auxiliary drive assembly, said first directional valve of the solenoid type and proportionally responsive to control signals, a vehicle operator's station remote from the vehicle cab, an auxiliary steering system for rotation of the vehicle steering column and served by said hydraulic pump and including a second directional valve and having an output shaft, a clutch engageable with said output shaft and power transmission means coupling said clutch with the vehicle steering column, said second directional valve being of the proportional type, and control means located at the operator's station for transmitting signals to said first and second directional valves for regulating flows from said valves in proportion to the signals received to control the speed and direction of the vehicle.

2. The improvement claimed in claim 1 additionally including a manually adjustable pressure regulator at the operator's station and in communication with the vehicle air brake system to enable the operator to apply partial brake application to the wheels of the vehicle.

3. The improvement claimed in claim 1 wherein said second directional valve is spring biased to a closed neutral position to maintain steerable wheels of the vehicle at a desired steering position in the absence of signals from said control means and controllable upon resumption of signals.

4. The improvmeent claimed in claim 1 wherein said auxiliary drive assembly includes a fan in place on said driveline for cooling said clutch of the auxiliary drive assembly.

5. The improvement claimed in claim 1 wherein said clutch of the auxiliary steering system is a pneumatic clutch having a maximum torque capacity less than that which could be imparted manually to the steering system to protect the steering components from severe loads.

6. The improvement claimed in claim 1 wherein said clutch includes plate members equipped with interengageable tooth components.

7. In a vehicle of the type having a cab for an operator of the vehicle; a vehicle engine; a vehicle transmission connected to the vehicle driveline; a vehicle steering system with components including a steering column and steerable wheels; a vehicle air brake system; and a power take-off engageable with the transmisison, the improvement comprising:

a hydraulic pump powered by the vehicle engine, an auxiliary drive assembly including a hydraulic motor driven by said pump, a gear reduction unit, a clutch including plate members carried by said driveline and power transmission means coupling said transmission to the clutch, a motor brake spring biased into engagement with an output shaft of said motor, a control circuit for said auxiliary drive assembly including a first directional valve in communication with inlet and outlet ports of the hydraulic motor via inlet and outlet lines, counterbalancing valves each respectively in communication with one of said lines and piloted by fluid pressure from the other of said lines, a brake release conduit in communication with said lines and with said motor brake to release the brake from the motor output shaft at a pressure below the piloted opening pressure of one of said counterbalancing valves, a torque relief valve normally closed and when open in communication with said inlet and outlet lines to dissipate motor torque, an operator's station exteriorly of the vehicle and remote from the vehicle cab, an auxiliary steering system for acting on the vehicle steering column and served by said hydraulic pump and including a second directional valve, a bi-directional steering motor in circuit with said second directional valve and having an output shaft, a clutch engageable with said output shaft and power transmission means coupling said clutch with the vehicle steering column, and control means located at the operator's station for transmitting signals to said first and second directional valves for regulating flows from said valves in proportion to the signals received to control the speed and direction of the vehicle, and said first and second directional valves being of the solenoid type and proportionally responsive to signals received.

8. The improvement claimed in claim 7 wherein said plate members are equipped with interengageable tooth components.

9. In a vehicle having a vehicle engine, a source of air pressure, a cab, a source of hydraulic pressure powered by the engine and a steering column, the improvement comprising, an auxiliary steering system for rotational movement of the steering column including a bi-directional hydraulic motor powered by the source of fluid pressure and having an output shaft, a directional valve served by fluid pressure and bi-directional hydraulic motor, a clutch in place on said output shaft of the motor and including a driven member powered by said motor upon actuation of the clutch, power transmission means coupling said driven member with the steering column, control means located exteriorly of the cab for transmitting signals to the directional valve for directing fluid pressure to said bi-directional motor for imparting rotation to the steering column.

10. The improvement claimed in claim 9 wherein said directional valve responds in a proportional manner to signals received from said control means.

11. The improvement claimed in claim 9 wherein said clutch is engaged with said power transmission means upon transmission of signals from said control means.

\* \* \* \* \*